(12) United States Patent
Brandt

(10) Patent No.: US 7,876,901 B2
(45) Date of Patent: Jan. 25, 2011

(54) ALTERNATIVE DESIGN FOR QUANTUM CRYPTOGRAPHIC ENTANGLING PROBE

(75) Inventor: Howard E. Brandt, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 852 days.

(21) Appl. No.: 11/693,009

(22) Filed: Mar. 29, 2007

(65) Prior Publication Data

US 2008/0240437 A1    Oct. 2, 2008

(51) Int. Cl.
*H04L 9/00* (2006.01)

(52) U.S. Cl. .................. 380/263; 380/256; 380/283; 380/278; 398/84; 398/140; 398/170

(58) Field of Classification Search ................ 380/263, 380/21, 256, 283, 278; 398/84, 140, 170
See application file for complete search history.

(56) References Cited

U.S. PATENT DOCUMENTS

| | | | |
|---|---|---|---|
| 5,243,649 A | 9/1993 | Franson | |
| 5,307,410 A | 4/1994 | Bennett | |
| 5,339,182 A | 8/1994 | Kimble et al. | |
| 5,414,771 A | 5/1995 | Fawcett, Jr. | |
| 5,515,438 A | 5/1996 | Bennett et al. | |
| 5,732,139 A | 3/1998 | Lo et al. | |
| 5,764,765 A | 6/1998 | Phoenix et al. | |
| 5,953,421 A | 9/1999 | Townsend | |
| 5,999,285 A * | 12/1999 | Brandt et al. | ............... 398/212 |
| 6,188,768 B1 | 2/2001 | Bethune et al. | |
| 6,289,104 B1 | 9/2001 | Patterson et al. | |
| 6,314,189 B1 | 11/2001 | Motoyoshi et al. | |
| 6,438,234 B1 | 8/2002 | Gisin et al. | |
| 6,473,719 B1 | 10/2002 | Steenblik | |
| 6,522,749 B2 | 2/2003 | Wang | |
| 6,529,601 B1 | 3/2003 | Townsend | |
| 6,678,379 B1 | 1/2004 | Mayers et al. | |
| 6,678,450 B1 | 1/2004 | Franson | |
| 6,741,374 B2 | 5/2004 | Pittman et al. | |
| 6,748,081 B1 | 6/2004 | Dultz et al. | |
| 6,801,626 B1 | 10/2004 | Nambu | |

(Continued)

OTHER PUBLICATIONS

Experimental demonstration of quantum logic operations using linear optical elements, J.D. Franson, et al. 2003, Fortschr. Phys.*

(Continued)

*Primary Examiner*—Taghi T Arani
*Assistant Examiner*—Gregory Lane
(74) *Attorney, Agent, or Firm*—Avrom David Spevack; Lawrence E. Anderson

(57) ABSTRACT

An alternative design is given for an optimized quantum cryptographic entangling probe for attacking the BB84 protocol of quantum key distribution. The initial state of the probe has a simpler analytical dependence on the set error rate to be induced by the probe than in the earlier design. The new device yields maximum information to the probe for a full range of induced error rates. As in the earlier design, the probe contains a single CNOT gate which produces the optimum entanglement between the BB84 signal states and the correlated probe states.

17 Claims, 3 Drawing Sheets

U.S. PATENT DOCUMENTS

| | | | |
|---|---|---|---|
| 6,895,092 B2 | 5/2005 | Tomita | |
| 7,006,267 B2 * | 2/2006 | Franson et al. | 359/107 |
| 7,292,342 B2 * | 11/2007 | Zaugg | 356/451 |
| 7,307,275 B2 | 12/2007 | Lidar et al. | |
| 2001/0055389 A1 | 12/2001 | Hughes et al. | |
| 2003/0086138 A1 | 5/2003 | Pittman et al. | |
| 2006/0056630 A1 * | 3/2006 | Zimmer et al. | 380/256 |
| 2008/0240437 A1 | 10/2008 | Brandt | |
| 2009/0175450 A1 | 7/2009 | Brandt | |

OTHER PUBLICATIONS

Coherent operation of a tunable quantum phase gate in cavity QED, A. Rauschenbeutel et al., 1999, The American Physical society.*

Probe optimization in four-state protocol of quantum cryptography, Howard E. Brandt, 2002, The American Physical society.*

Quantum dots are used to build logic gates, R. Colin Johnson, Apr. 28, 1999, EETimes.*

Bennett, "Quantum Cryptography: Public Key Distribution and Coin Tossing", Proceedings of the IEEE International Conference on Computers, Systems & Signal Processing, Bangalore, India (IEEE, New York, 1984, pp. 175-179) Dec. 10-12, 1984.

Brandt, Howard E.; "Alternative Design for Quantum Cryptographic Entangling Probe", J. Modern Optics, vol. 53, No. 8, May 20, 2006, pp. 1041-1045.

N. Gisin, et al., Quantum Crptography, Rev, Mod. Phys. 74, 145-192 (2002).

S. Wiesner, "Conjugate Coding," SIGACT News 15, 78-88 (1983).

H.E. Brandt, et al., "Expanded Quantum Cryptographic Entangling Probe," Journal of Modern Optics, vol. 53, No. 13, 1927-1930. (Sep. 10, 2006).

H.E. Brandt, "Alternative Design for Quantum Cryptographic Entangling Probe," Abstract, Bulletin of the American Physical Society, 2006 APS March Meeting, Monday-Friday, (Mar. 13-17, 2006) Baltimore, MD; http://meetings.aps.org/link/BAPS.2006.MAR.W40.4.

H.E. Brandt, "Conclusive Entangling Probe" Submitted on Sep. 13, 2005, arXiv:quant-ph/0509088.

C.H. Bennett, "Quantum Cryptography Using Any Two Nonorthogonal States," Phys. Rev. Letter. 68, 3121-3124 (1992).

A.K. Ekert, "Quantum Cryptography Based on Bell's Theorem," Phys. Rev. Lett. 57, 661-663 (1991).

H.E. Brandt, "Positive Operator Valued Measure in Quantum Information Processing," Am. J. Phys. 67, 434-439 (1999).

C.H. Bennett, et al. "Generalized Privacy Amplification,"IIII Trans. Inf. Theor. 41, 1915-1923 (1995).

C. H. Bennett, et al. "Experimental Quantum Cryptography," J. Cryptography 5, 3-28 (1992).

B.A. Slutsky, et al., "Security of Quantum Cryptography Against Individual Attacks," Phys. Rev. A57, 2383-2398 (1998).

C.A. Fuchs, et al. "Quantum-State Disturbance Versus Information Gain: Uncertainty Relations for Quantum Information," Phys. Rev. A53, 2038-2045 (1996).

H.E. Brandt, "Probe Optimization in Four-State Protocol of Quantum Cryptography," Phys. Rev. A66, 032303-1-16 (2002).

H.E. Brandt, "Secrecy Capacity in The Four-State Protocol of Quantum Key Distirbution," J. Math Phys. 43, 4526-4530 (2002).

H.E. Brandt, "Optimization Problem in Quantum Cryptography," J. Optics B5, S557-560. Quantum Semiclass. Opt. 5 (2003).

H.E. Brandt, "Optimum Probe Parameters for Entangling Probe in Quantum Key Distribution," Quantum Information Processing, vol. 2, Nos. 1-2, 37-79 (2003).

H.E. Brandt, "Optimized Unitary Transform for BB84 Entangling Probe," SPIE Proceedings, vol. 5436, 48-64 (2004).

Jeffrey H. Shapiro "Performance Analysis for Brandt's Conclusive Entangling Probe," Quantum Information Processing, vol. 5, No. 1, Feb. 2006.

G. Vidal, et al., "Universal quantum circuit for two-qubit transformations with three controlled-NOT gates," Phy. Rev. A69, 010301-1-4 (2004).

Brandt, "Eavesdropping optimization for quantum cryptography using a positive operator-valued measure," Physical Review A vol. 59, No. 4 (Apr. 1999), pp. 2665-2669.

Brandt,"Inconclusive rate as a disturbance measure in quantum cryptography," Phys. Rev. A, vol. 62, Issue 4 042310 (2000).

Brandt, "Inconclusive rate in quantum key distribution." Phys. Rev. A vol. 64 Issue 4 042316(2001).

H. Brandt, "Quantum-Crytographic Entangling Probe," Physical Rev. A. 71, 042312 (Apr. 6, 2005).

H. Brandt, "Design For a Quantum Cryptographic Entangling Probe," Journal of Modern Optics, vol. 522, No. 16, Nov. 10, 2005, pp. 2177-2185.

* cited by examiner

ALTERNATIVE DESIGN FOR QUANTUM CRYPTOGRAPHIC ENTANGLING PROBE

RELATED APPLICATIONS

This application is related to and claims benefit of U.S. patent application Ser. No. 11/239,461 filed 16 Sep. 2005 which, in turn claims benefit of Provisional Application 60/617,796 filed 9 Oct. 2004. This invention is a continuation-in-part and an improvement on the earlier application by the same inventor that is incorporated herein in its entirety by reference.

BACKGROUND OF THE INVENTION

1. Field of the Invention

This invention relates to cryptographic entangling probes used in communications.

2. Description of the Prior Art

Recently, a design was given by H. E. Brandt, "Quantum cryptographic entangling probe," Phys. Rev. A 71, 042312 (14) (2005) [1]. H. E. Brandt, "Design for a quantum cryptographic entangling probe," J. Modern Optics 52, 2177-2185 (2005) [2] for an optimized entangling probe attacking the BB84 Protocol, C. H. Bennett and G. Brassard, Quantum cryptography: "public key distribution and coin tossing", Proceedings of the IEEE International Conference on Computers, Systems, and Signal Processing, Bangalore, India (IEEE, New York, 1984), pp. 175-179 [3] of quantum key distribution (QKD) and yielding maximum Renyi information to the probe for a set error rate induced by the probe. Probe photon polarization states become optimally entangled with the BB84 signal states on their way between the legitimate transmitter and receiver. Standard von Neumann projective measurements of the probe yield maximum information on the pre-privacy amplified key, once basis information is revealed during reconciliation. A simple quantum circuit was found, consisting of a single CNOT gate, and faithfully producing the optimal entanglement. The control qubit consists of two photon polarization-basis states of the signal, the target qubit consists of two probe photon polarization basis states, and the initial state of the probe is set by an explicit algebraic function of the error rate to be induced by the probe. A method was determined for measuring the appropriate probe states correlated with the BB84 signal states and yielding maximum Renyi information to the probe. The design presented in [1], [2] was limited to error rates not exceeding ¼, but is generalized in the instant invention to allow a full range of error rates from 0 to ⅓, H. E. Brandt and J. M. Myers, J. Mod. Optics, 53, 1927-1930 (2006) [4].

SUMMARY OF THE INVENTION

Accordingly, an object of this invention is an improved probe.

These and additional objects of the invention are accomplished by a new and simpler probe design for which the induced error rate also ranges from 0 to ⅓. It is based on an alternative optimum unitary transformation in [1], also yielding the same maximum Renyi information to the probe. The initial state of the probe has a simpler algebraic dependence on the set error rate to be induced by the probe. The alternative optimized unitary transformation is reviewed, representing the action of an optimized entangling probe yielding maximum information on quantum key distribution in the BB84 protocol. In the Section QUANTUM CIRCUIT AND PROBE DESIGN that follows, the quantum circuit and design are given for the new entangling probe. The concluding Section contains a summary.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF THE PREFERRED EMBODIMENTS

Figure 1:
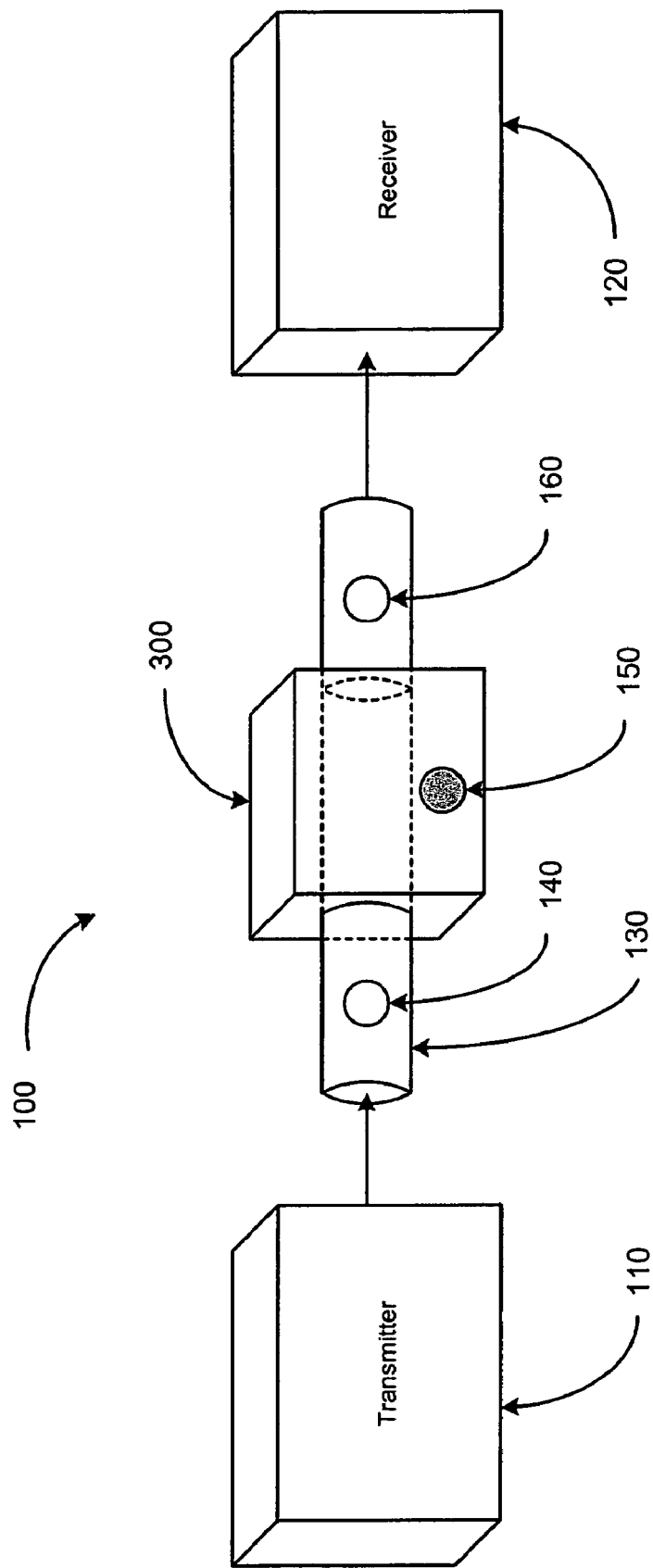
FIG. 1 is a schematic diagram of an embodiment of a system utilizing a quantum cryptographic entangling probe.

Reference is now made in detail to the description of several exemplary embodiments as illustrated in the drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

The present disclosure provides systems and methods for obtaining maximum Rényi information on the pre-privacy-amplified key in the BB84 protocol of quantum key distribution.

Figure 3:
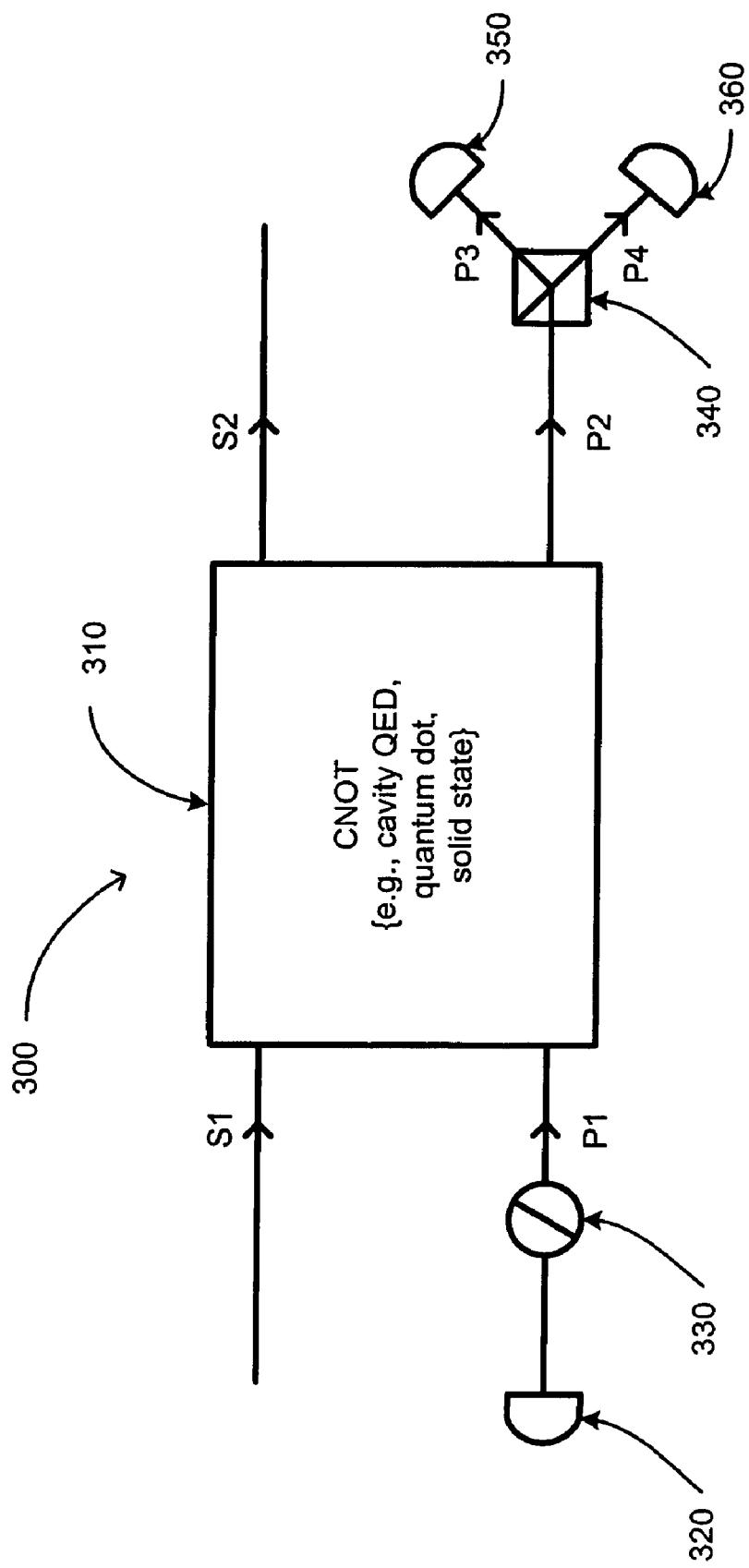
FIG. 3 is a schematic diagram of another embodiment of a system for obtaining information on a key in BB84 protocol of quantum key distribution incorporating an embodiment of a quantum cryptographic entangling probe.

FIG. 1 shows a system 100 utilizing a quantum cryptographic entangling probe 300 to obtain maximum Rényi information from a transmitted signal. The quantum cryptographic entangling probe 300 is presented in greater detail in the discussion regarding FIG. 3 below. The transmitter 110 sends a signal photon 140 (an incident photon) through a quantum channel 130. The quantum channel 130 is an optical pathway and may be optical fiber or airspace, as non-limiting examples. The quantum cryptographic entangling probe 300 entangles a probe photon (not shown) with the transmitted signal photon 140 to produce a gated probe photon 150 and a gated signal photon 160. The gated signal photon 160 is relayed to the receiver 120, while the gated probe photon 150 is utilized by the quantum cryptographic entangling probe 300 to determine the state that will most likely be measured by the receiver 120 in response to receiving the gated signal photon 160.

Figure 2:
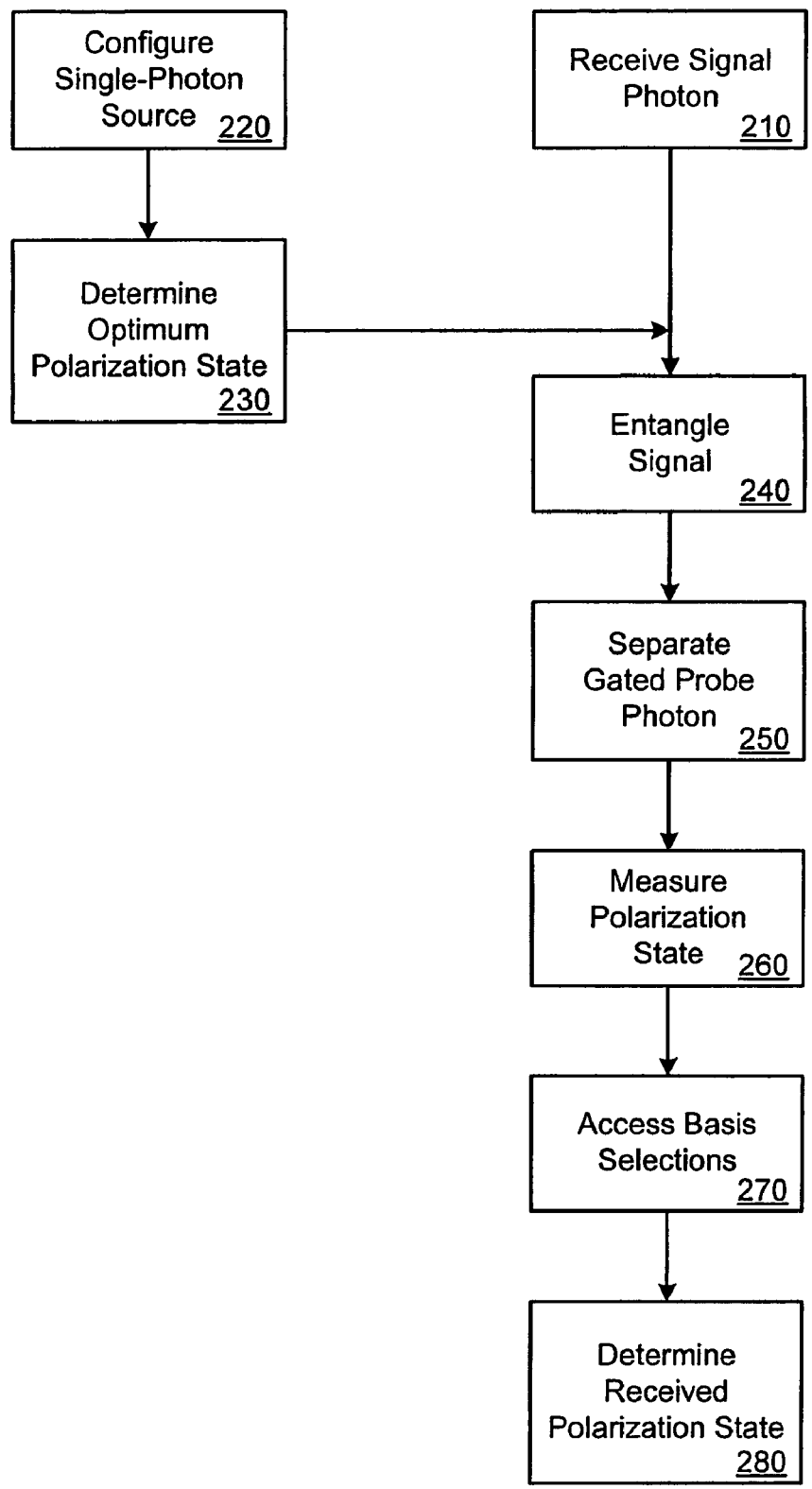
FIG. 2 is flowchart of an embodiment of a method for obtaining information on a key in BB84 protocol of quantum key distribution incorporating an embodiment of a quantum cryptographic entangling probe.

FIG. 2 is a flowchart depicting an embodiment of a method for obtaining information on a key in the BB84 protocol of quantum key distribution, and thus for determining the state most likely measured by a receiver. A signal photon 140, is received from a transmitter 110 in step 210. A single-photon source 320 (see FIG. 3) is configured for producing a probe photon in step 220. The optimum probe photon polarization state, corresponding to a set error rate induced by the quantum cryptographic entangling probe 300, is determined in step 230. In step 240, the signal photon 140 received in step 210 is entangled with the probe photon from step 230 to produce a gated probe photon 150. The gated probe photon 150 is separated in step 250 with polarization correlated to a signal measured by a receiver. Step 260 shows that the polarization state of the gated probe photon 150 is measured. Finally, the information on polarization-bases selection utilized by the transmitter and receiver is accessed on a public classical communication channel in step 270 so that the polarization state measured by the receiver 120 may be determined in step 280.

For the standard four-state (BB84) protocol, Bennett (1984), of quantum key distribution in quantum cryptography, an eavesdropping probe optimization was performed, by B. A. Slutsky, R. Rao, P. C. Sun, and Y. Fainman, "Security of quantum cryptography against individual attacks," *Phys. Rev. A* Vol. 57, pp. 2383-2398 (1998), which is incorporated herein by reference in its entirety, which on average yields the most information to the eavesdropper for a given error rate caused by the probe. The most general possible probe consistent with unitarity was considered in which each individual transmitted bit is made to interact with the probe so that the carrier and the probe are left in an entangled state, and measurement by the probe, made subsequent to measurement by the legitimate receiver, yields information about the carrier state. The probe can be used in an individual attack in which each transmitted photon is measured independently, given that the polarization basis is revealed on the public communication channel. See the following references: Slutsky (1998), as above; C. A. Fuchs and A. Peres, "Quantum-state disturbance versus information gain: uncertainty relations for quantum information," *Phys. Rev. A* Vol. 53, pp. 2038-2045 (1996); H. E. Brandt, "Probe optimization in four-state protocol of quantum cryptography," *Phys. Rev. A Vol.* 66, 032303-1-16 (2002); H. E. Brandt, "Secrecy capacity in the four-state protocol of quantum key distribution," *J. Math. Phys.* Vol. 43, pp. 4526-4530 (2002); H. E. Brandt, "Optimization problem in quantum cryptography," *J. Optics B* Vol. 5, S557-560 (2003); H. E. Brandt, "Optimum probe parameters for entangling probe in quantum key distribution," *Quantum Information Processing* Vol. 2, pp. 37-79 (2003); and H. E. Brandt, "Optimized unitary transformation for BB84 entangling probe," *SPIE Proc.*, Vol. 5436, pp. 48-64 (2004), all of which are incorporated herein by reference in their entirety. It should be noted that in Equation (132) of Brandt (2004), $\sin \mu$ and $\cos \mu$ should be interchanged in the coefficient of only. Also, $e_{2\theta}$ should be $e_\theta$. In Equation (195), the overall sign of the coefficient of $|w_2\rangle$ should be $\mp$ rather than $\pm$.

A complete optimization was performed by Brandt ("Probe optimization in four-state protocol of quantum cryptography," 2002, "Optimization problem in quantum cryptography," 2003, "Optimum probe parameters for entangling probe in quantum key distribution," 2003, and "Optimized unitary transformation for BB84 entangling probe," 2004 above), in which three previously unknown sets of optimum probe parameters were obtained, all yielding the identical maximum information gain by the probe. The probe optimizations were based on maximizing the Rényi information gain by the probe on corrected data for a given error rate induced by the probe in the legitimate receiver. A minimum overlap of the probe states which are correlated with the signal states (because of the entanglement) determines the maximum Rényi information gain by the probe. This is related to the idea that the more nearly orthogonal the correlated states are, the easier they are to distinguish. The upper bound on Rényi information gain by the probe is needed to calculate the secrecy capacity of the BB84 protocol and to determine the number of bits which must be sacrificed during privacy amplification in order that it be exponentially unlikely that more than token leakage of the final key be available to the eavesdropper following key distillation (see Brandt, "Secrecy capacity in the four-state protocol of quantum key distribution," 2002).

In the present work, an implementation was determined of the optimum unitary transformation given by Eqs. (158)-(164) of [1], however with restricted parameters such that the corresponding Hilbert space of the probe reduces from four to two dimensions. In particular, the parameters $\mu$ and $\theta$ are here restricted to $$\sin \mu = \cos \mu = 2^{-1/2}; \cos \theta = 1; \tag{1}$$

In this case, the entangling probe states $|\sigma_+\rangle$, $|\sigma_-\rangle$, $|\sigma\rangle$, $|\delta_+\rangle$, $|\delta_-\rangle$, $|\delta\rangle$, given by Eqs. (159)-(164) of [1], become $$|\sigma_+\rangle = |\delta_-\rangle = 4[(1-2E)^{1/2}|w_0\rangle - E^{1/2}|w_b\rangle], \tag{2}$$

$$|\sigma_+\rangle = |\delta_-\rangle = 4[(1-2E)^{1/2}|w_a\rangle + E^{1/2}|w_b\rangle], \tag{3}$$

$$|\sigma\rangle = -|\delta\rangle = 4E^{1/2}|w_b\rangle, \tag{4}$$

in which the upper sign choices in Eqs. (159)-(164) of [1] have been made, E is the error rate induced by the probe, and the orthonormal probe basis vectors $|w_a\rangle$ and $|w_b\rangle$ are defined by $$|w_a\rangle = 2^{-1/2}(|w_0\rangle + |w_3\rangle), \tag{5}$$

$$|w_b\rangle = 2^{-1/2}(|w_1\rangle - |w_2\rangle), \tag{6}$$

expressed in terms of the orthonormal basis vectors $|w_0\rangle$, $|w_3\rangle$, $|w_1\rangle$, and $|w_2\rangle$ of [1]. Thus, the optimum unitary transformation, Eq. (158) of [1] produces in this case the following entanglements for initial probe state $|w\rangle$ and incoming BB84 signal photon-polarization states $|u\rangle$, $|\bar{u}\rangle$, $|v\rangle$, or $|\bar{v}\rangle$, respectively:

$$|u\rangle \otimes |w\rangle \to \frac{1}{4}(|u\rangle \otimes |\sigma_+\rangle + |\bar{u}\rangle \otimes |\sigma\rangle), \tag{7}$$

$$|\bar{u}\rangle \otimes |w\rangle \to \frac{1}{4}(|u\rangle \otimes |\sigma\rangle + |\bar{u}\rangle \otimes |\sigma_-\rangle), \tag{8}$$

$$|v\rangle \otimes |w\rangle \to \frac{1}{4}(|v\rangle \otimes |\sigma_-\rangle - |\bar{v}\rangle \otimes |\sigma\rangle), \tag{9}$$

$$|\bar{v}\rangle \otimes |w\rangle \to \frac{1}{4}(-|v\rangle \otimes |\sigma\rangle + |\bar{v}\rangle \otimes |\sigma_-\rangle), \tag{10}$$

Here, the probe states $|\sigma_+\rangle$, $|\sigma_-\rangle$, $|\sigma\rangle$ are given by Eqs. (2)-(4). The states $|u\rangle$ and $|\bar{u}\rangle$ are orthogonal linearly-polarized photon signal states in the $\{|u\rangle, |\bar{u}\rangle\}$ basis, and $|v\rangle$ and $|\bar{v}\rangle$ are orthogonal linearly-polarized photon signal states in the $\{|v\rangle, |\bar{v}\rangle\}$ basis, and the two bases are nonorthogonal with $\pi/4$ angle between the linear polarizations of states $|u\rangle$ and $|v\rangle$. In the present case, the maximum information gain by the probe is again given by $$I_{opt}^R = \log_2\left[2 - \left(\frac{1-3E}{1-E}\right)^2\right], \tag{11}$$

and here $E \le \frac{1}{3}$, since $E = \frac{1}{3}$, according to Eq. (11), corresponds to perfect information gain by the probe.

Quantum Circuit and Probe Design

Using the same methods presented in [1], it can be shown that a quantum circuit consisting again of a single CNOT gate suffices to produce the optimum entanglement, Eqs. (7)-(10). Here, the control qubit entering the control port of the CNOT gate consists of the two signal basis states $\{|e_0\rangle, |e_1\rangle\}$. In the two-dimensional Hilbert space of the signal, the basis states $|e_0\rangle$ and $|e_1\rangle$, respectively, are orthonormal and make equal angles of $\pi/8$ with the nonorthogonal signal states $|u\rangle$ and $|v\rangle$, respectively. The target qubit entering the target port of the CNOT gate consists of the two orthonormal linearly-polarized photon polarization computational basis states $2^{-1/2}(|w_a\rangle \pm |w_b\rangle)$. When $|e_0\rangle$ enters the control port, $\{|w_a\rangle, |w_b\rangle\}$ becomes $\{|w_a\rangle, -|w_b\rangle\}$, and when $|e_1\rangle$ enters the control port, $\{|w_a\rangle, |w_b\rangle\}$ remains the same. The initial unnormalized target state of the probe can, in this case, be shown to be given by:

$$|A_2\rangle = (1-2E)^{1/2}|w_a\rangle + (2E)^{1/2}|w_b\rangle, \quad (12)$$

and the unnormalized transition state is given by $$|A_1\rangle = (1-2E)^{1/2}|w_a\rangle - (2E)^{1/2}|w_b\rangle. \quad (13)$$

Next, by arguments directly paralleling those of [1], using Eqs. (7)-(10), one has the following correlations between the signal states and the projected probe states, $|\sigma_{30}\rangle$ and $|\sigma_-\rangle$:

$$|u\rangle\langle\sigma_+|, |\bar{u}\rangle\langle\sigma_-|, \quad (14)$$

and $$|v\rangle\langle\sigma_-|, |\bar{v}\rangle\langle\sigma_+|, \quad (15)$$

The measurement basis for the symmetric von Neumann projective measurement of the probe must be orthogonal and symmetric about the correlated probe states, $|\sigma_+\rangle$ and $|\sigma_-\rangle$ in the two-dimensional Hilbert space of the probe [1]. Thus, consistent with Eqs. (2) and (3), I define the following orthonormal measurement basis states:

$$|w_+\rangle = 2^{-1/2}(|w_a\rangle + |w_b\rangle), \quad (16)$$

$$|w_-\rangle = 2^{-1/2}(|w_a\rangle - |w_b\rangle). \quad (17)$$

Next, one notes that the correlations of the projected probe states $|\sigma_+\rangle$ and $|\sigma_-\rangle$ with the measurement basis states $|w_+\rangle$ and $|w_-\rangle$ are indicated, according to Eqs. (2), (3), (16), and (17), by the following probabilities:

$$\frac{|\langle w_+|\sigma_+\rangle|^2}{|\sigma_+|^2} = \frac{|\langle w_-|\sigma_-\rangle|^2}{|\sigma_-|^2} = \frac{1}{2} - \frac{E^{1/2}(1-2E)^{1/2}}{(1-E)}, \quad (18)$$

$$\frac{|\langle w_+|\sigma_-\rangle|^2}{|\sigma_-|^2} = \frac{|\langle w_-|\sigma_+\rangle|^2}{|\sigma_+|^2} = \frac{1}{2} + \frac{E^{1/2}(1-2E)^{1/2}}{(1-E)}, \quad (19)$$

consistent with Eqs. (198) and (199) of [1], and implying the following dominant state correlations:

$$|\sigma_+\rangle\langle w_-|, |\sigma_-\rangle\langle w_+|. \quad (20)$$

Next combining the correlations (14), (15), and (20), one thus establishes the following correlations:

$$\{|u\rangle, |\bar{v}\rangle\}\langle\sigma_+|\langle w_-|. \quad (21)$$

$$\{|\bar{u}\rangle, |v\rangle\}\langle\sigma_-|\langle w_+|. \quad (22)$$

to be implemented by the projective measurement of the probe, as in [1]. One therefore arrives at the following alternative entangling probe design. An incident photon coming from the legitimate transmitter is received by the probe in one of the four signal-photon linear-polarization states $|u\rangle$, $|\bar{u}\rangle$, $|v\rangle$, or $|\bar{v}\rangle$ in the BB84 protocol. The signal photon enters the control port of a CNOT gate. The initial state of the probe is a photon in linear-polarization state $|A_2\rangle$ entering the target port of the CNOT gate. The probe photon is produced by a single-photon source and is appropriately timed with reception of the signal photon by first sampling a few successive signal pulses to determine the repetition rate of the transmitter. The photon linear-polarization state $|A_2\rangle$, according to Eq. (12), is given by $$|A_2\rangle = (1-2E)^{1/2}|w_a\rangle + (2E)^{1/2}|w_b\rangle, \quad (23)$$

and can be simply set for an error rate E by means of a polarizer. (Note that this initial probe state has a simpler algebraic dependence on error rate than that in [1] or [4]).

In accord with Eq. (23), the entangling probe can be tuned to the chosen error rate to be induced by the probe. The outgoing gated signal photon is relayed on to the legitimate receiver, and the gated probe photon enters a Wollaston prism, oriented to separate photon orthogonal-linear-polarization states $|w_+\rangle$ and $|w_-\rangle$, and the photon is then detected by one of two photodetectors. This is an ordinary symmetric von Neumann projective measurement. If the basis, revealed during the public basis-reconciliation phase of the BB84 protocol, is $\{|u\rangle, |\bar{u}\rangle\}$, then the photodetector located to receive the polarization state $|w_-\rangle$ or $|w_+\rangle$, respectively, will indicate, in accord with the correlations (21) and (22), that a state $|u\rangle$ or $|\bar{u}\rangle$, respectively, was most likely measured by the legitimate receiver.

Alternatively, if the announced basis is $\{|v\rangle, |\bar{v}\rangle\}$, then the photodetector located to receive the polarization state $|w_{30}\rangle$ or $|w_-\rangle$, respectively, will indicate, in accord with the correlations (21) and (22), that a state $|v\rangle$ or $|\bar{v}\rangle$, respectively, was most likely measured by the legitimate receiver. By comparing the record of probe photodetector triggering with the sequence of bases revealed during reconciliation, then the likely sequence of ones and zeroes constituting the key, prior to privacy amplification, can be assigned. In any case the net effect is to yield, for a set error rate E, the maximum Renyi information gain to the probe, which is given by Eq. (11).

CONCLUSION

An alternative design is given for an optimized quantum cryptographic entangling probe for attacking the BB84 protocol of quantum key distribution. The initial state of the probe has a simpler analytical dependence on the set error rate to be induced by the probe. The device yields maximum information to the probe for a full range of induced error rates. As in the earlier design, the probe contains a single CNOT gate which produces the optimum entanglement between the BB84 signal states and the correlated probe states, and is measured by making a symmetric von Neumann projective test.

Obviously, many modifications and variations of the present invention are possible in light of the above teachings. It is therefore to be understood that, within the scope of the appended claims, the invention many be practiced otherwise than as specifically described.

What is claimed is:

1. A system for deciphering information encoded using a quantum key by determining the polarization states of the signal photons encoding the quantum key, comprising:
   a quantum entangling probe comprising:
   an input for receiving signal photons having polarization states encoding a quantum key; a single-photon source for producing a probe photon;
   a probe photon polarizer; a quantum controlled-NOT (CNOT) gate configured to provide entanglement of a signal photon with the probe photon so that the signal photon and the probe photon have entangled polarization states to obtain information on the quantum key; the quantum controlled-NOT (CNOT) gate comprising first and second outputs; the first output operating to output the probe photon and the second output operating to output the signal photon; a beam splitter configured to separate the possible polarization states of the probe photon; and two photodetectors configured to measure the polarization state of the probe photon; wherein the quantum key is used for data transmission to an intended receiver and the quantum key is being intercepted by an unintended recipient and wherein the intended receiver is not able to determine that the quantum key has been intercepted and wherein the quantum CNOT gate is configured to provide entanglement of the signal photon with the probe photon so as to obtain Renyi information from the signal photon.

2. The system of claim 1, wherein the beam splitter comprises a Wollaston prism and wherein the two photodetectors comprise two single-photon detectors.

3. The system of claim 1, wherein the CNOT gate is one of a quantum dot implementation or a cavity QED implementation.

4. The system of claim 1, wherein the CNOT gate is a solid state implementation.

5. The system of claim 1, further comprising a polarization filter configured to determine an optimum initial probe photon polarization state for a set error rate induced by the quantum cryptographic entangling probe.

6. A method for deciphering data encoded through the use of a quantum key by obtaining information on a quantum key, using probe photons, the quantum key being transmitted using signal photons having photon polarization states, said method comprising:
    producing a probe photon;
        determining an initial probe photon polarization state of the probe photon;
        entangling a signal photon transmitting a quantum key with the probe photon so that the state of the probe photon is correlated to the signal photon state; and
        measuring the polarization state of the probe photon to determine the correlated photon state measured by the legitimate receiver;
        wherein the quantum key is in the BB84 protocol of quantum key distribution and wherein the step of entangling comprises entangling the signal with the probe photon polarization state so as to obtain Renyi information from the signal and further comprising the step of accessing information on polarization-basis selection available on a public classical communication channel between the transmitter and the receiver.

7. The method of claim 6, further comprising receiving a signal photon from a transmitter and wherein the step of producing a single probe photon comprises configuring a single-photon source to produce a probe photon.

8. The method of claim 6, wherein the step of determining an initial probe photon polarization state comprises determining an initial probe photon polarization state of the probe photon corresponding to a set error rate induced by the probe and further comprising relaying an outgoing gated signal photon to the receiver in the same state as received.

9. The method of claim 6, further comprising the step of separating possible polarization states of the probe photon utilizing a Wollaston prism subsequent to the polarization state having been correlated with a signal photon.

10. The method of claim 6, further comprising the step of separating possible polarization states of the probe photon utilizing a polarization beam splitter.

11. The method of claim 6, wherein the single-photon source is synchronized with the signal photons from the transmitter by first sampling successive signal pulses to determine a repetition rate of the transmitter.

12. A system for deciphering information encoded using a quantum key by determining the polarization states of the signal photons embodying the quantum key, comprising:
    means for producing a probe photon; means for determining an initial probe photon polarization state
    means for providing entanglement of the signal photon with the probe photon so as to obtain Renyi information from the signal;
    the means for providing entanglement comprising a quantum controlled-NOT (CNOT) gate configured to provide entanglement of the signal photon with the probe photon so that the signal photon and the probe photon have entangled polarization states to obtain information on the quantum key;
    means for separating the possible probe photon polarization states;
    means for measuring the polarization state of the probe photon in order to determine the polarization state measured by the receiver.

13. The system of claim 12, wherein the means producing a probe photon comprises means for configuring a single-photon source to produce a probe photon and wherein the system further comprising means for receiving a signal photon from a transmitter.

14. The system of claim 12, further comprising means for determining an optimum initial probe photon polarization state corresponding to a set error rate induced by a probe and means for relaying an outgoing signal photon to a receiver.

15. The system of claim 12, further comprising means for timing the single photon source by receiving a signal photon from a transmitter by first sampling successive signal pulses to determine a repetition rate of the transmitter.

16. The system of claim 12 further comprising means for accessing information on polarization-basis selection available on a public classical communication channel between the transmitter and the receiver.

17. The system of claim 12 wherein the quantum key is a quantum key-utilizing the BB84 protocol.

* * * * *

UNITED STATES PATENT AND TRADEMARK OFFICE
CERTIFICATE OF CORRECTION

PATENT NO. : 7,876,901 B2
APPLICATION NO. : 11/693009
DATED : January 25, 2011
INVENTOR(S) : Howard E. Brandt It is certified that error appears in the above-identified patent and that said Letters Patent is hereby corrected as shown below:

In Col. 3, line 43, replace "of only" with --of $|w_3\rangle$ only--.

In Col. 4, lines 6, replace "[1]" with --Brandt (2005)--;
replace line 17 with -- $|\sigma_-\rangle = |\delta_+\rangle = 4\left[(1-2E)^{1/2}|w_a\rangle + E^{1/2}|w_b\rangle\right],$ (3) --;
lines 20, 29, & 30, replace "[1]" with --Brandt (2005)--;
replace line 43, with -- $|\bar{v}\rangle \otimes |w\rangle \rightarrow \frac{1}{4}(-|v\rangle \otimes |\sigma\rangle + |\bar{v}\rangle \otimes |\sigma_+\rangle),$ (10) --; and
line 66, replace "[1]" with --Brandt (2005)--.

In Col. 5, line 20, replace "[1]" by --Brandt (2005)--;
line 22, replace " $|\sigma_{30}\rangle$ " with -- $|\sigma_+\rangle$ --;
replace line 23 with -- $|u\rangle \Leftrightarrow |\sigma_+\rangle \quad |\bar{u}\rangle \Leftrightarrow |\sigma_-\rangle,$ (14) --;
replace line 27 with -- $|v\rangle \Leftrightarrow |\sigma-\rangle \quad |\bar{v}\rangle \Leftrightarrow |\sigma+\rangle,$ (15) --;
lines 32, and 51, replace "[1]" by --Brandt (2005)--;
replace line 53 with -- $|\sigma_+\rangle \Leftrightarrow |w_-\rangle, \quad |\sigma_-\rangle \Leftrightarrow |w_+\rangle.$ (20) --;
replace line 57 with -- $\{|u\rangle, |\bar{v}\rangle\} \Leftrightarrow |\sigma_+\rangle \Leftrightarrow |w_-\rangle.$ (21) --;
replace line 59 with -- $\{|\bar{u}\rangle, |v\rangle\} \Leftrightarrow |\sigma_-\rangle \Leftrightarrow |w_+\rangle.$ (22) --; and
line 62, replace "[1]" by --Brandt (2005)--;

In Col. 6, line 12, replace "[1]" by --Brandt (2005)--; and "[4]" by --Brandt et al. (2006)--;
line 28, replace " $|w_{30}\rangle$ " with -- $|w_+\rangle$ --.

Signed and Sealed this
Eighth Day of March, 2011

David J. Kappos
*Director of the United States Patent and Trademark Office*